(12) United States Patent
Mahmood

(10) Patent No.: US 9,528,433 B2
(45) Date of Patent: Dec. 27, 2016

(54) DOUBLE BARS AND SINGLE WHEEL ROTARY COMBUSTION ENGINE

(76) Inventor: Fahim Mahmood, Sylhet (BD)

( * ) Notice: Subject to any disclaimer, the term of this patent is extended or adjusted under 35 U.S.C. 154(b) by 220 days.

(21) Appl. No.: 13/438,848

(22) Filed: Apr. 4, 2012

(65) Prior Publication Data

US 2013/0263817 A1 Oct. 10, 2013

(51) Int. Cl.
*F02B 53/00* (2006.01)
*F01C 21/08* (2006.01)
*F01C 1/352* (2006.01)

(52) U.S. Cl.
CPC .............. *F02B 53/00* (2013.01); *F01C 1/352* (2013.01); *F01C 21/08* (2013.01); *F01C 21/0809* (2013.01); *Y02T 10/17* (2013.01)

(58) Field of Classification Search
CPC ..... F02B 53/00; F02B 53/02; F02B 2053/005; F02B 2075/027; F02B 1/04; F02B 1/08; F01C 21/0809; F01C 21/08; F01C 1/352; F01C 1/084; F01C 1/086; F01C 1/22; F01C 1/24; F01C 17/02; F01C 17/00; F01C 17/04; F01C 1/07; F01C 1/077; F01C 1/344; F01C 1/3446; Y02T 10/17
USPC ...................................... 60/200, 213
See application file for complete search history.

(56) References Cited

U.S. PATENT DOCUMENTS

| | | | | |
|---|---|---|---|---|
| 1,427,053 A * | 8/1922 | Bidwell | .................. | F02B 53/00 123/231 |
| 2,071,799 A * | 2/1937 | Mabille | ..................... | F01C 1/04 123/243 |
| 2,162,851 A * | 6/1939 | Lister | .................... | F01C 1/3442 123/216 |
| 2,444,213 A * | 6/1948 | Weeks | ...................... | F02C 5/02 60/39.34 |
| 2,907,307 A * | 10/1959 | Striegl | ......................... | 123/206 |
| 3,132,632 A * | 5/1964 | Kehl | .................... | F01C 1/3442 123/243 |
| 3,150,646 A * | 9/1964 | Bernard | ....................... | 123/213 |
| 3,200,796 A * | 8/1965 | Kraic et al. | ............. | F01C 1/352 418/138 |
| 3,451,381 A * | 6/1969 | Armstrong | ........... | F01C 1/3442 123/243 |
| 3,782,110 A * | 1/1974 | Kobayashi | ................... | 60/39.43 |
| 3,886,908 A * | 6/1975 | Ruzic | ............................ | 123/213 |
| 3,908,608 A * | 9/1975 | Fox | ............................... | 123/213 |
| 3,964,442 A * | 6/1976 | Hunter | ..................... | F01C 1/32 123/242 |

(Continued)

Primary Examiner — Mary A Davis

(57) ABSTRACT

In my proposed invention two bars of same length and width named as prime mover and follower are incorporated within an eccentric wheel. The follower bar-end is pivoted with power shaft while prime mover bar-end is fixed with said power shaft at the center of the inner circular chamber. Prime mover rotates the eccentric wheel and that wheel rotates the follower by the hinged joints and this assembly rotation creates compressed volume and expanded volume alternatively within inner circular chamber and a spark in air-fuel mixture after compression stage creates combustion. This principle of engine operation also includes different sealing types and outward opening type cam assembly. In conventional reciprocating engine lots of power is lost because of change of direction of piston motion. This problem can be overcome by my proposed engine design which will lead to a higher efficiency in automobile and power generation sector.

12 Claims, 13 Drawing Sheets

(56) References Cited

U.S. PATENT DOCUMENTS

| | | | | |
|---|---|---|---|---|
| 3,970,050 | A * | 7/1976 | Hoadley | 123/213 |
| 3,989,011 | A * | 11/1976 | Takahashi | 123/204 |
| 4,241,713 | A * | 12/1980 | Crutchfield | F02B 53/06 |
| | | | | 123/202 |
| 4,437,441 | A * | 3/1984 | Menioux | 123/213 |
| 4,848,296 | A * | 7/1989 | Lopez | F02B 53/00 |
| | | | | 123/242 |
| 5,423,297 | A * | 6/1995 | Roberts | 123/213 |
| 6,250,279 | B1 * | 6/2001 | Zack | 123/241 |
| 6,550,442 | B2 * | 4/2003 | Garcia | F02B 53/00 |
| | | | | 123/229 |
| 7,415,962 | B2 * | 8/2008 | Reisser | 123/245 |
| 7,913,663 | B2 * | 3/2011 | Cobbs | 123/242 |
| 2008/0121207 | A1 * | 5/2008 | Pelov | 123/213 |
| 2009/0133664 | A1 * | 5/2009 | Reid | 123/200 |
| 2009/0148323 | A1 * | 6/2009 | Scheen | F02B 53/02 |
| | | | | 418/3 |
| 2010/0180858 | A1 * | 7/2010 | Omori | 123/245 |
| 2010/0251990 | A1 * | 10/2010 | McDonald | 123/200 |
| 2011/0000460 | A1 * | 1/2011 | Guenther | 123/200 |
| 2011/0247583 | A1 * | 10/2011 | Shkolnik et al. | 123/245 |
| 2013/0263817 | A1 * | 10/2013 | Mahmood | F02B 53/00 |
| | | | | 123/200 |

\* cited by examiner

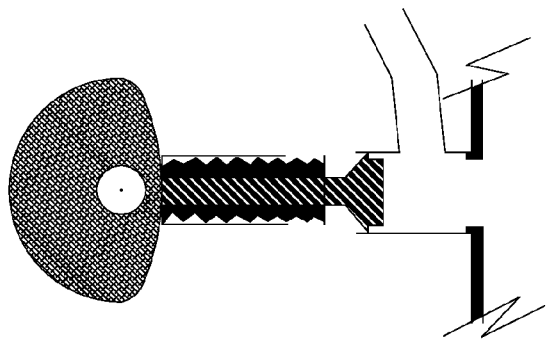
Fig.2C       Fig.2F
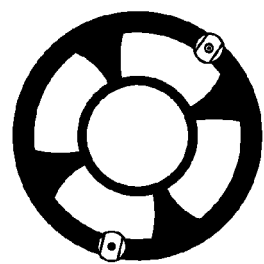
Fig.2B
Fig.2E
Fig.2A
Fig.2D
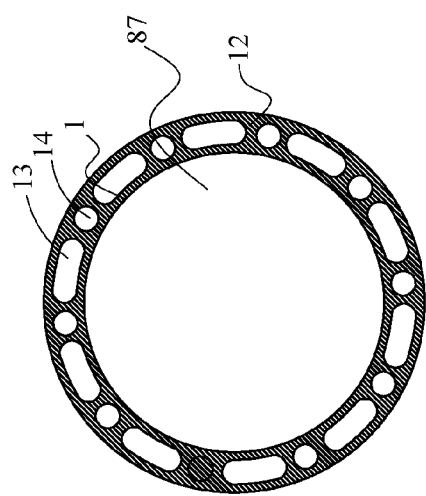

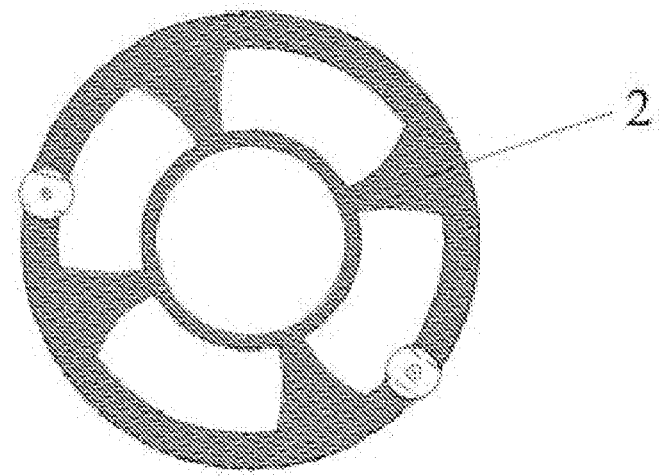
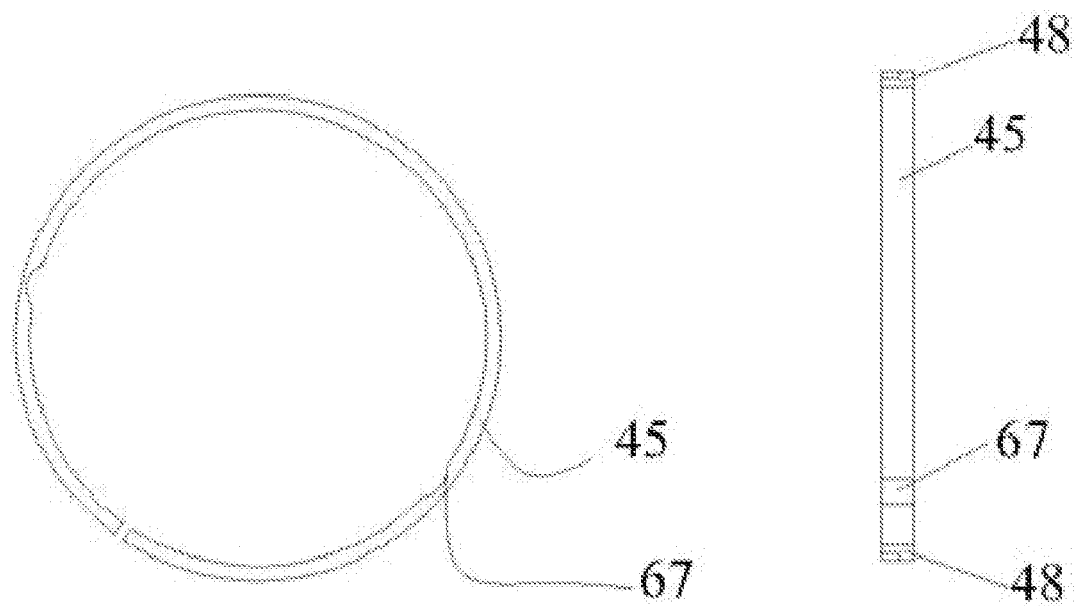
Fig. 9A
Fig. 9B

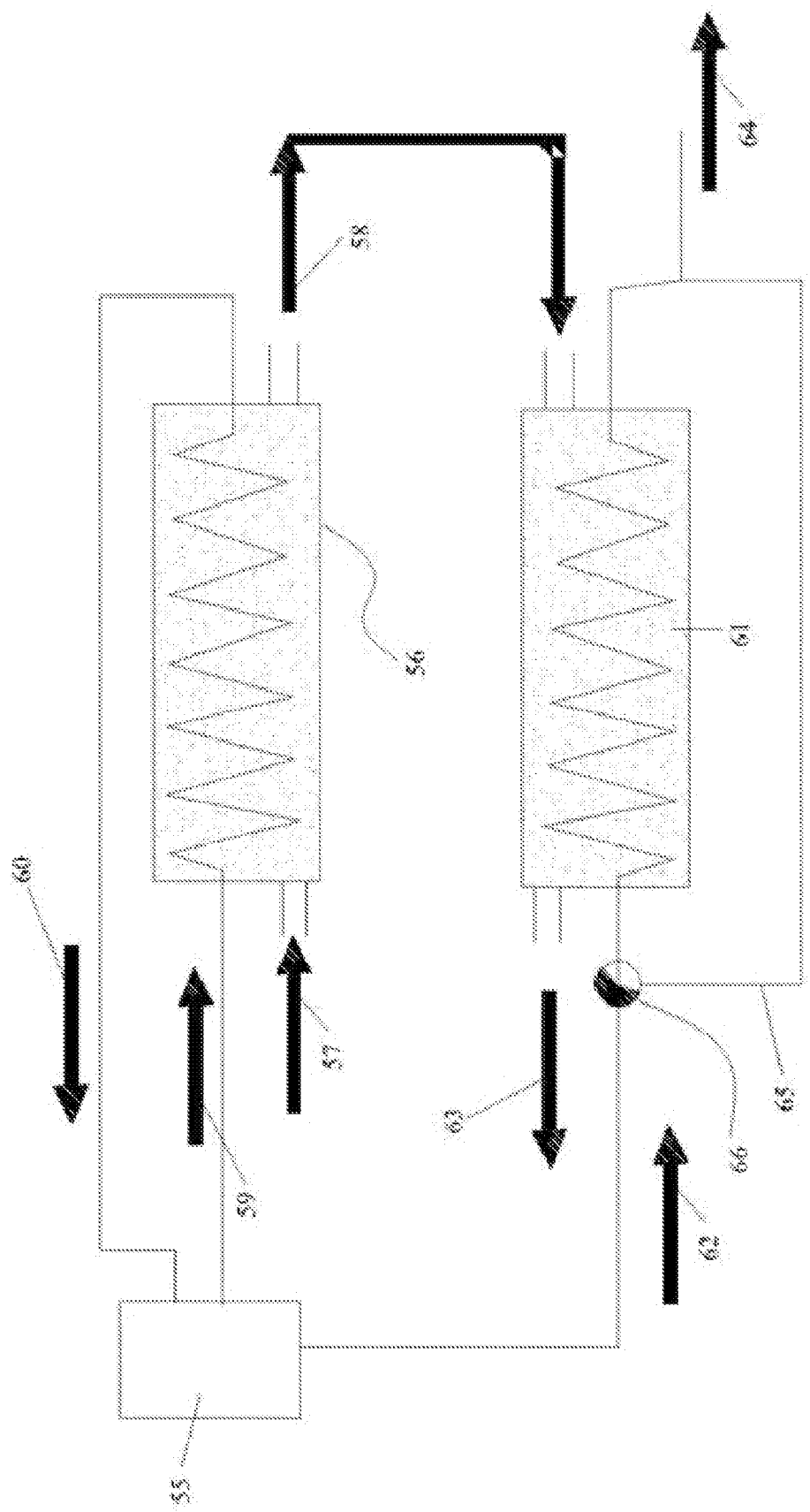

DOUBLE BARS AND SINGLE WHEEL ROTARY COMBUSTION ENGINE

CROSS-REFERENCE TO RELATED APPLICATIONS

Three engine inventions are somewhat close to my invention. These are as follows:
1) The Lamb engine, 1842
2) The Hult engine, 1889
3) The Throtter engine,

STATEMENT REGARDING FEDERALLY SPONSORED RESEARCH OR DEVELOPMENT (Not Applicable)

REFERENCE TO SEQUENCE LISTING, A TABLE, OR A COMPUTER PROGRAM LISTING COMPACT DISC APPENDIX (Not Applicable)

BACKGROUND OF THE INVENTION

This invention is basically best suited for automobiles and power generation. It is an improvement for rotary spark ignition internal combustion engine. Now a days reciprocating engine dominates clearly all other rotary engine in automobiles because of its high torque and high wear rate in rotary engine. However this reciprocating engine converts reciprocating motion to rotary motion and lots of power is lost through this motion conversion. The most efficient SI engine which has fuel efficiency not more than 30%. As a result lots of heat is lost through exhaust. In rotary engine there is no motion conversion. So lots of power can be used, i.e. higher usable power leads to higher fuel savings which provoked me for the invention of rotary engine. Though Wankel engine is the most effective in rotary engine till now but because of the low torque at low rpm and sealing problem this type of engine tends to obsolete now a days.

BRIEF SUMMARY OF THE INVENTION

My rotary engine consists of two rectangular shaped bars and a wheel. Two bars are incorporated within the wheel and each one end of the two bars is centered at a point and the other two free ends of two bars are sliding but hinged at two points at the perimeter of the wheel. The bars rotate with respect to that center point and the wheel rotates with respect to another center which is slightly offset than the center point relating the bars. One of the two ends of the mating bars is fixed with power shaft and this bar is termed as prime mover while the other end is only hinged with this power shaft. When this prime mover rotates the wheel rotates and it also rotates the other bar by hinged sliding joints. As a result differential volume is created between the bars with respect to the wheel with rotation of the prime mover, i.e. compressed volume and expanded volume are created and a spark in compressed volume creates combustion which accelerates the rotation of prime mover and hence power is generated at the power shaft or output shaft.

BRIEF DESCRIPTION OF THE SEVERAL VIEWS OF THE DRAWING

I would like to describe the notations used in drawings (1) main circle or housing circle or a circle stands for a boundary of the inner circular chamber or the inner circular chamber itself wherein this inner circular chamber is a cylindrical space defined by wall of the housing (12).
(2) circle for wheel or the wheel itself or the main wheel. Inside it, the two bars take different position.
(3) the prime mover bar of which one end is fixed with power shaft.
(4) center of the hinged joint for follower bar which is fixed with the wheel
(5) the follower bar of which one end is hinged with power shaft.
(6) center of the hinged joint for prime mover bar which is fixed with the wheel
(7) center of the wheel
(8) direction of rotation of wheel and the two bars assembly
(9) wheel journal bearing attached with housing
(10) the power shaft of hollow shaped or power output
(11) center of the power shaft
(12) housing for wheel and the two bars assembly
(13) water circulation hole
(14) hole for bolt
(15) cam assembly for inlet
(16) hinged guider wheel for prime mover bar, through which a rectangular hole perpendicular to the periphery of the guider wheel pass. The area of hole is almost same as prime mover rectangular cross section area. The purpose of this wheel is to let prime mover to slide inside as well as to guide it.
(17) chain for camshaft of inlet.
(18) cam assembly for outlet
(19) two spark plugs.
(20) hinged guider wheel for follower bar. The purpose of wheel is same as (16).
(21) very small half cubic volume for spark plug which is open to the combustion chamber.
(22) hollow rectangular area of the hinged guider wheel
(23) width of the wheel (2)
(24) surface area of bar at cross section
(25) linear reciprocating or sliding direction of bar with respect to the hinged guider wheel
(26) direction of rotation of the wheel (2)
(27) circular reciprocating direction of guider hinged wheel
(28) special designed or hemicycle profiled cam for inlet or outlet
(29) inlet or outlet valve stem and air bellow housing
(30) flexible air bellow to replace conventional spring in camshaft assembly.
(31) inlet or outlet valve
(32) break line
(33) inlet or outlet port
(34) fixed surface in camshaft assembly
(35) camshaft
(36) cut away volume inside the wheel (2) such that prime mover can move freely without contradiction with the wheel (2)
(37) cut away volume inside the wheel (2) such that follower can move freely without contradiction with the wheel (2)
(38) cut away area guider hinged wheel (20)
(39) cut away area guider hinged wheel (16)
(40) guided way for the specific bar
(41) two sealing bars at the outer side wall and two sealing bars at the inner guide wall of cross sectional shape (50) for the guider hinged wheel (20) and (16)
(42) circular sealing ring of cross sectional shape (48)

(43) the (44) shaped straight sealing bar is grooved at the both side wall of the prime mover and follower bar. This type sealing assembly follows shape of (48)
(44) shape of sealing bar from side.
(45) sealing ring around the wheel (2) periphery for both wheel (2) and guider hinged wheels that follows shape 50.
(46) break line used for edges.
(47) sectional side of edge of blocks
(48) cross section of horizontal seal type
(49) pleated type spring
(50) cross section of vertical seal type
(51) break line
(52) pleated type spring
(53) hole inside prime mover. One side of hole is open to the non-combustion side inside housing (1) and other end of hole is open to hollow portion of power shaft. This hole is used for engine breathing.
(54) hollow portion inside power shaft which is open to the atmosphere
(55) engine block assembly
(56) heat exchanger for transmit heat from lubricating oil to intake air
(57) entry of fresh intake air into the heat exchanger (56)
(58) outlet of fresh heated intake air from the heat exchanger (56) and entry fresh intake air for heat exchanger (61)
(59) entry of heated lubricating oil from engine into the heat exchanger (56)
(60) outlet of cooled lubricating oil from the heat exchanger (56) and back to engine block assembly (55)
(61) heat exchanger for transmit partial heat from exhaust gas to intake air
(62) exhaust gas from engine
(63) heated intake air at certain temperature from the heat exchanger (61) which flows then to fuel mixing chamber.
(64) combination of heat exchanger (61) exhaust gas and by pass (65) exhaust gas
(65) by pass line for exhaust gas
(66) throttle valve to control temperature of intake air' into fuel mixing chamber'. This controlling is done by advanced microprocessor unit. The temperature of intake air is maintained in such a way that auto ignition does not occur in combustion chamber because of compression. Throttle valve mainly controls the flow of exhaust gas into heat exchanger (61) which will regulate peak temperature of intake air.
(67) groove in sealing ring (45) for guider hinged wheel (16) & (20).
(68) area between two sealing rings where little amount of lubricating oil circulates.
(87) Cylindrical cavity within inner circular chamber (1)

Detailed description of drawing figures are described below.

Figure 1:
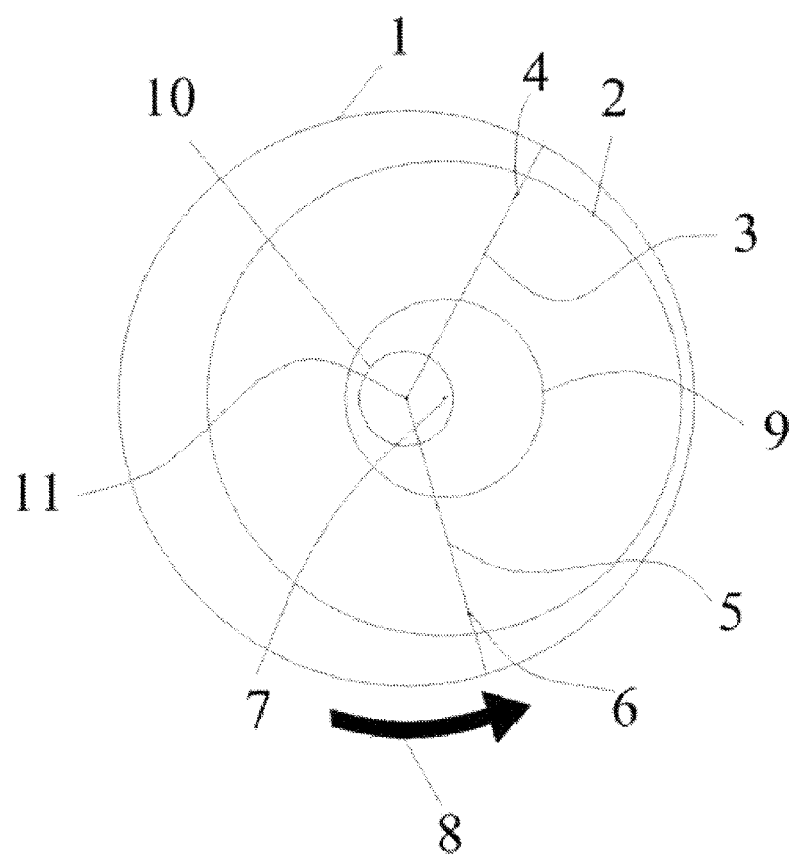

FIG. 1 shows main circle (1) and its center (11). Two bars (3) & (5) are rotating with respect to the center point (11). One end of prime mover (3) is fixed at center point (11) or (10) the power shaft and one end of follower bar is hinged at power shaft (10). The other two ends of each two bar are hinged by sliding motion at point (4) & (6) respectively by hinged guider wheel. All this assembly is to be stored inside the wheel (2) whose center point (7) is offset from center point (11). It is to be mentioned that the radius of wheel (2) is less than that of the main circle (1). Decreasing the radius of the wheel (2) circle will result higher the compression ratio. Another thing is to be mentioned that the power shaft is to be placed within the journal bearing housing of the wheel (2) and obviously there is no direct connection between the power shaft (10) and the wheel (2).

FIG. 2A, FIG. 2B, FIG. 2C, FIG. 2D, FIG. 2E and FIG. 2F represents housing, wheel (2), cut away view of wheel (2), the prime mover (3), the follower bar (5) and camshaft assembly respectively.

Figure 3:
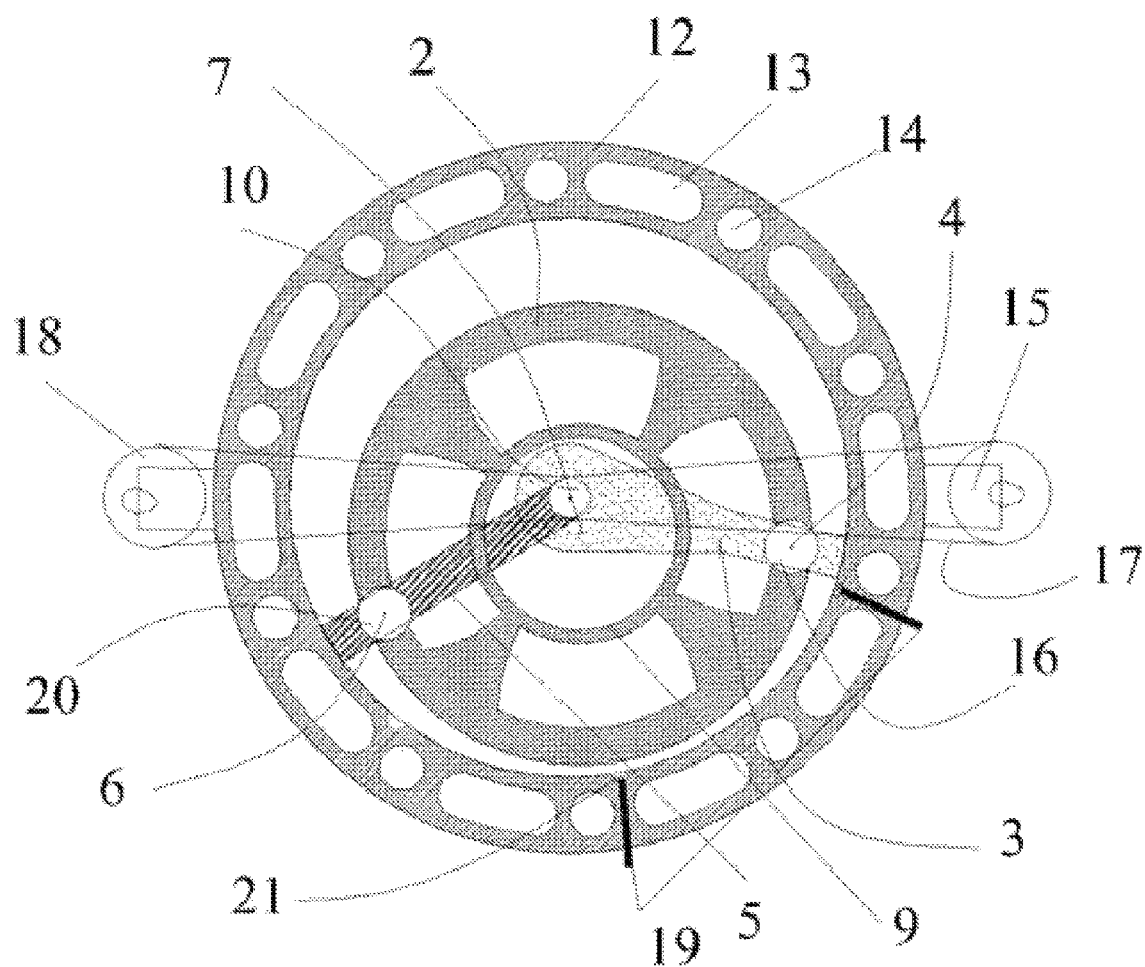

FIG. 3 represents the complete engine assembly with parts main circle (1) or housing circle, circle (2) for wheel or the wheel itself, the prime mover bar (3), center (4) of the hinged joint for follower bar, the follower bar (5), center (6) of the hinged joint for prime mover, center (7) of the wheel (2), direction (8) of rotation of wheel and the two bars assembly, wheel journal bearing (9) attached housing, the power shaft (10) of hollow shaped or power output and center (11) of the power shaft.

Figure 4:
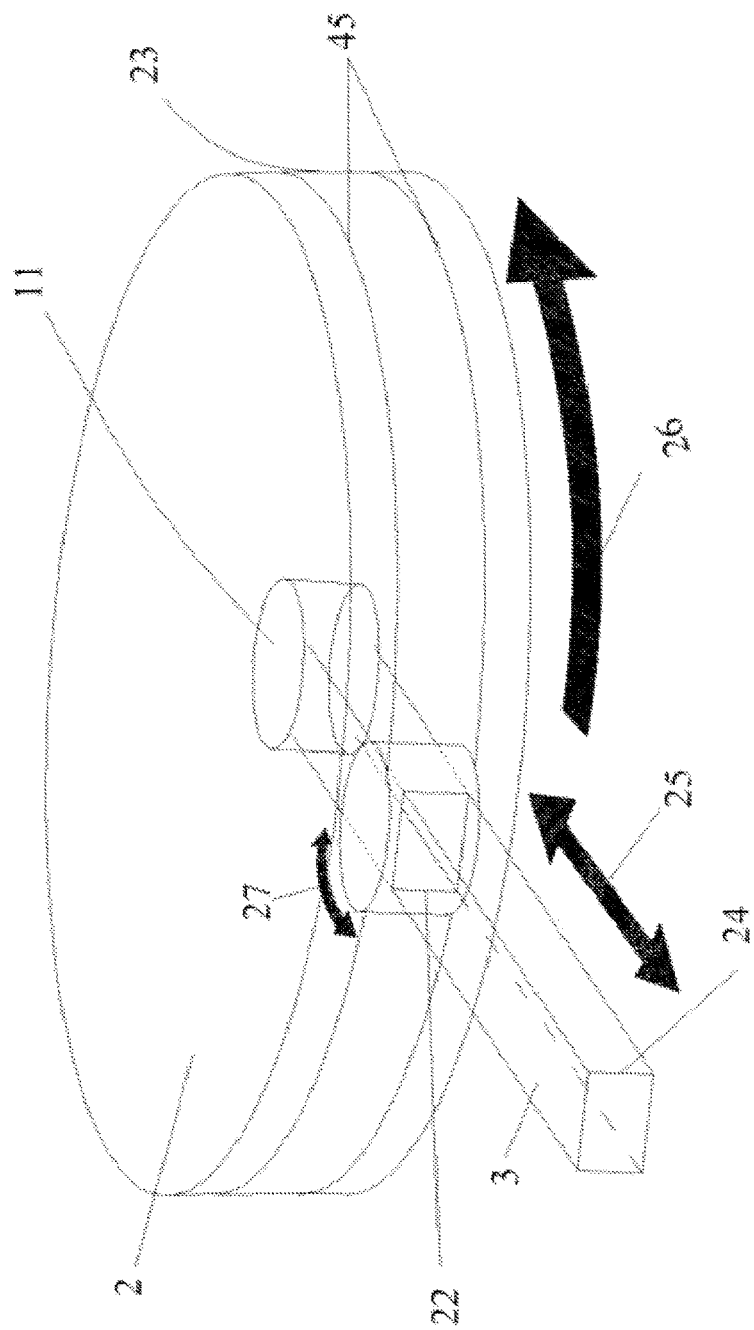

FIG. 4 represent partial 3D view of wheel (2) assembly.

Figure 5:
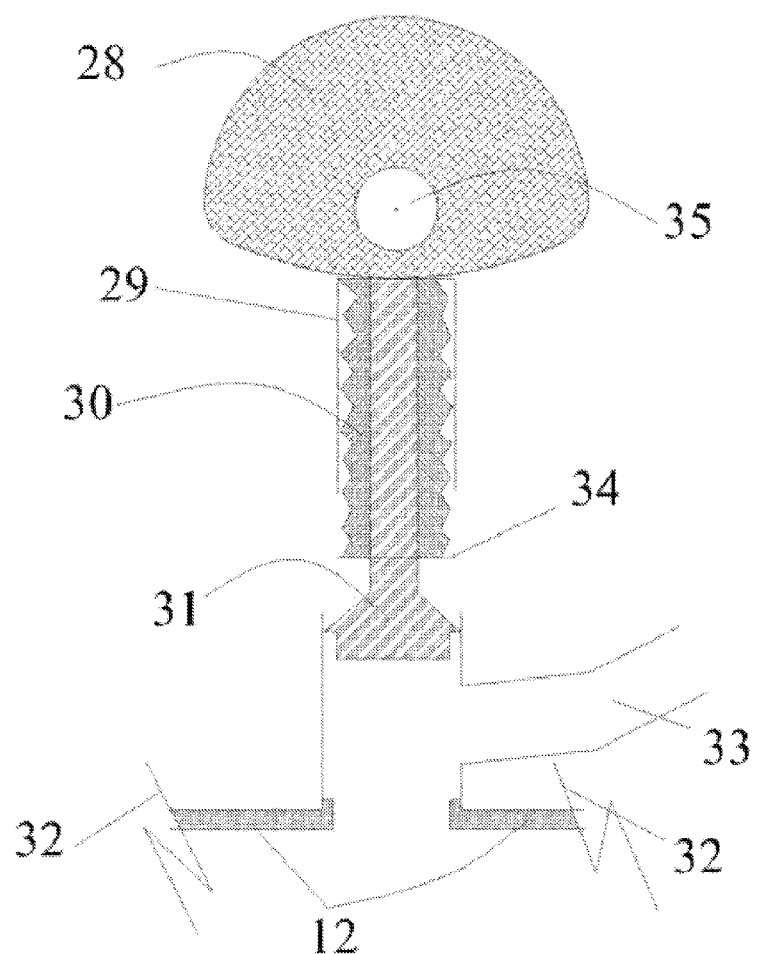

FIG. 5 represent camshaft assembly at fully open condition of inlet or outlet valve. At this stage the (30) flexible air bellow expands at full length.

Figure 6:
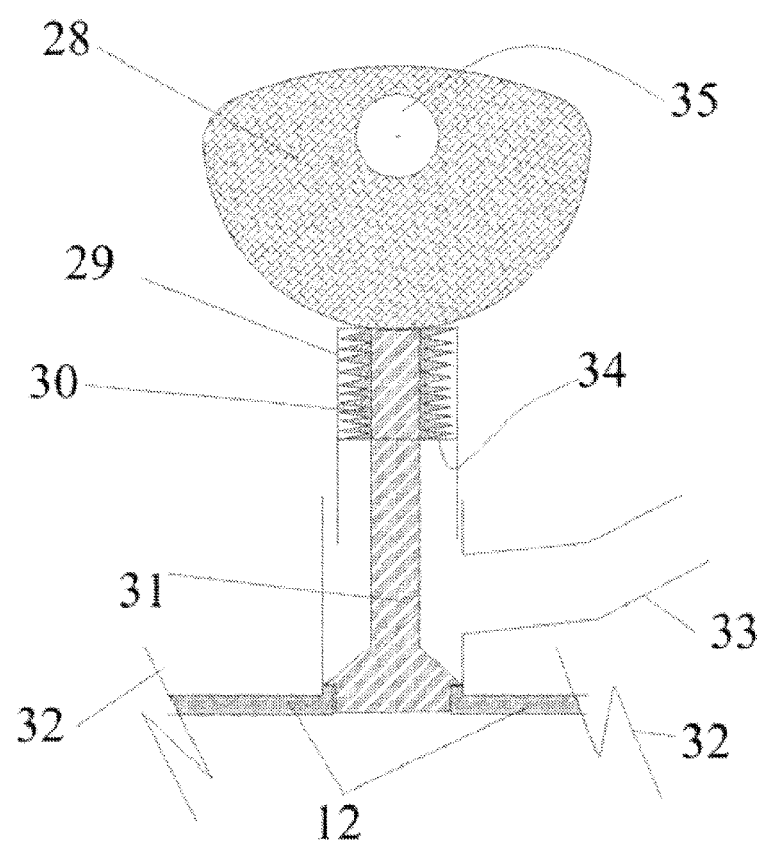

FIG. 6 represent camshaft assembly at fully closed condition of inlet or outlet valve. At this stage the (30) flexible air bellow is compressed fully.

FIG. 7A, FIG. 7B, FIG. 7C, FIG. 7D represent intake, compression, combustion and exhaust stroke respectively.

FIG. 8A, FIG. 8B, FIG. 8C, FIG. 8D shows cut away view of engine assembly a little later from fully expansion stroke, approaching to the compression stroke, combustion stroke and approaching to expansion stroke respectively.

FIG. 9A represent sealing ring (45) on the periphery of the wheel (2).

FIG. 9B represent right hand side view of sealing ring (45).

Figure 9C:
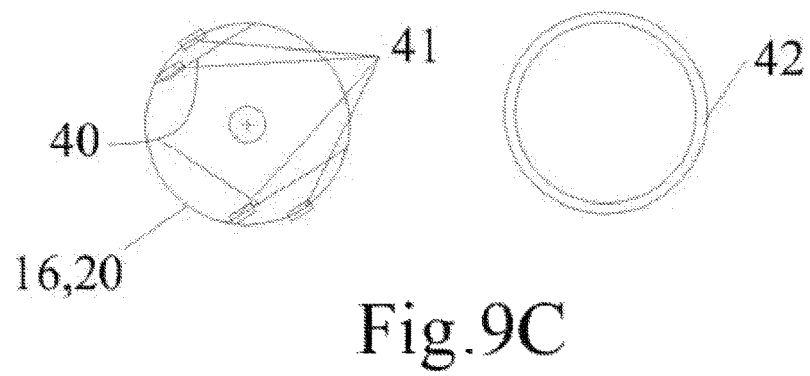

FIG. 9C represent four bar type sealing objects for internal and external wall of guider wheel (16), (20).

Figure 9D:
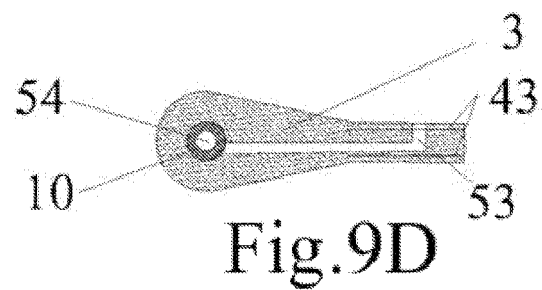

FIG. 9D represent top View of prime mover bar (3). There is an internal hole within the prime mover bar (3) which is connected to the hollow portion of the power shaft (10).

Figure 9E:
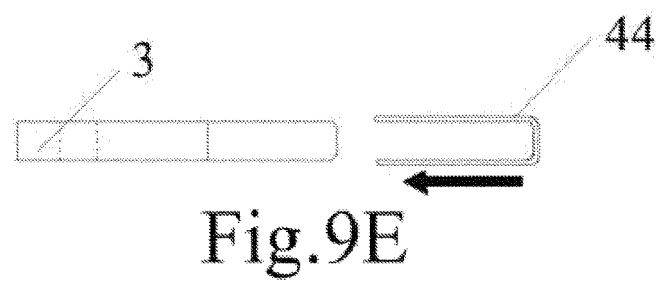

FIG. 9E represent front view of the prime mover bar (3) as well as sealing object which is be grooved at (43) marked area of the prime mover bar as directed.

Figure 10A:
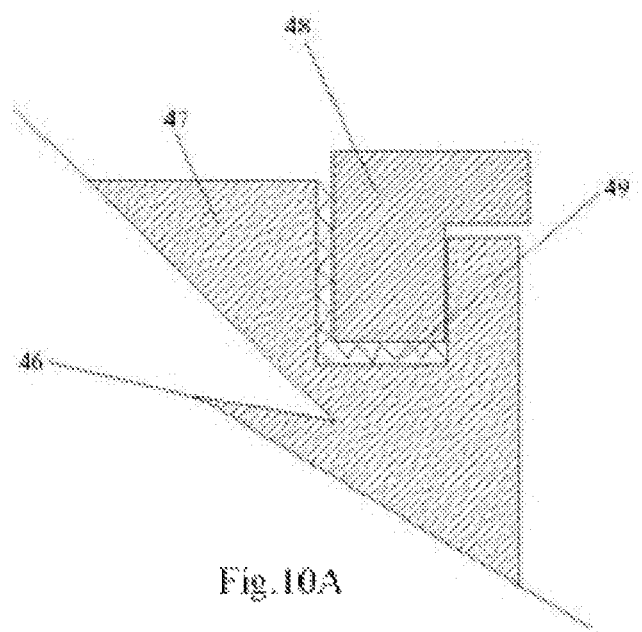
Figure 10B:
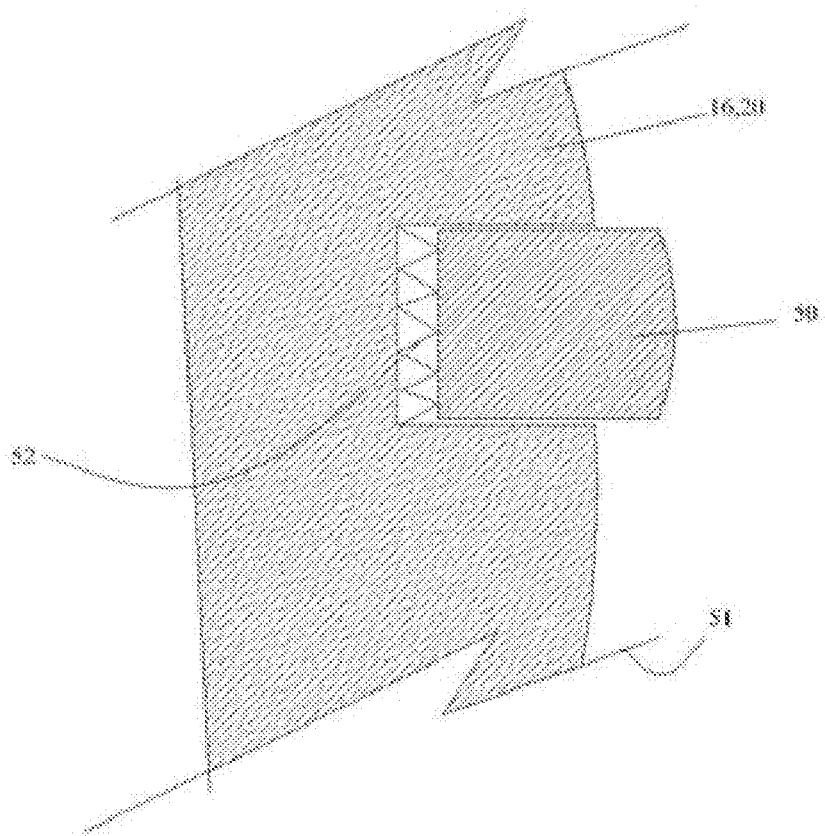

FIG. 10A and FIG. 10B represent the cross sectional area of two type of sealing object used in this engine.

FIG. 11 shows diagram of two stage heat transfer to the intake air.

Figure 12:
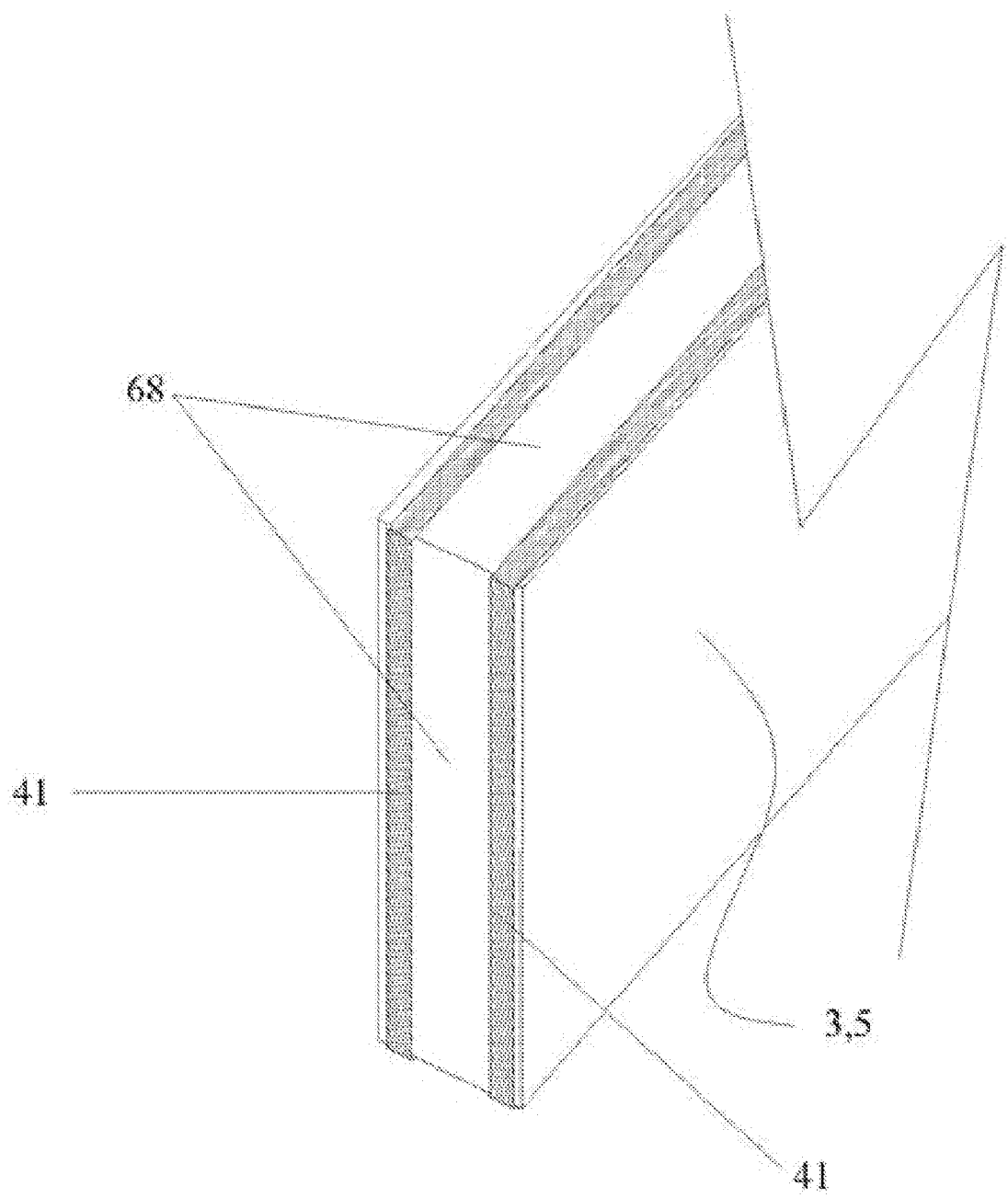

FIG. 12 shows sealing bar seat at the end of bar (housing side).

DETAILED DESCRIPTION OF THE INVENTION

As like FIG. 1, using of two circles (1) & (2) of different radius is the basis on which this invention relates. The smaller radius circle (2) is within higher radius circle (1) such that no circle touches each other. The center of the lower radius circle is offset to the center of higher radius circle. Two bars (3), (5) whose one end of each bar is centered to the center of higher radius circle and length of each bar is equal to the higher radius. The centered two ends should be such that one end should be fixed with the center or power shaft (10) and other end should only be hinged with it. There is another wheel (2) whose radius is equal to the lower radius, rotates with respect to the offset center, i.e. two bars are rotating with respect to the higher radius circle center and wheel (2) is rotating with respect to the offset lower radius circle center. The free ends of the two bars are guided and hinged at (4) and (6) by an specific angle (in my drawing angle between the two hinge points is 154° for the wheel) and these two bars are to be installed within the wheel (2) through the guided hinge points. The guided hinge point is basically a hinged smaller wheel (having rectangular hole inside laterally) through which the bar can slide without noticeable friction. The whole assembly is then be put into housing (12) in such a way that the inner portion of the wheel can be partially open to the lubricating oil flow and outer portion of the wheel in which area the bars rotate is to be airtight. The wheel rotates within the housing by large bearings (9) covering a concentric void (FIG. 3 or FIG. 8A thru FIG. 8D) and power shaft (10) will pass through this concentric void as directed in drawing. When the prime mover rotates the wheel by guided hinge joint, relative position of the two bars changes with respect to wheel and therefore compressed volume and expanded volumes are repetitively generated with rotation. This is the basic concept of my designed engine. This engine is a four stroke engine. Like reciprocating engine it has intake, compression, combustion and exhaust stroke. In this engine the angle between the two bars changes with rotation. In the drawings the angle is 136° while in full compression and 174° while in full expansion which indicates better fuel efficiency can be achieved by this engine.

Figure 7A:
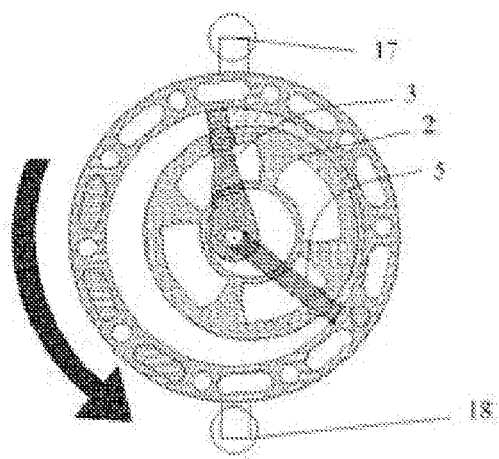
Figure 7B:
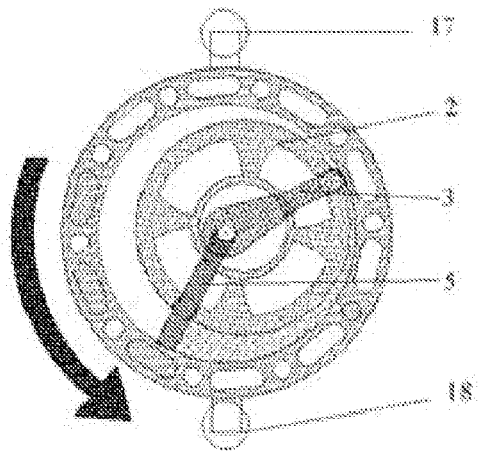
Figure 7C:
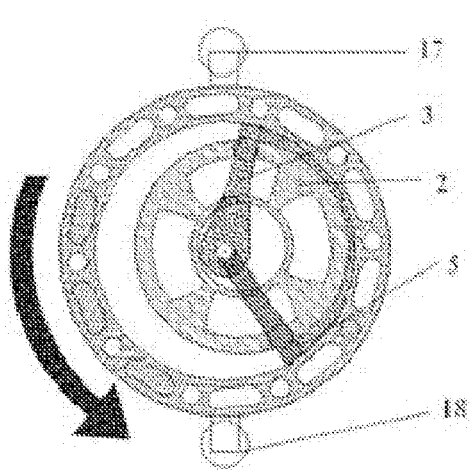
Figure 7D:
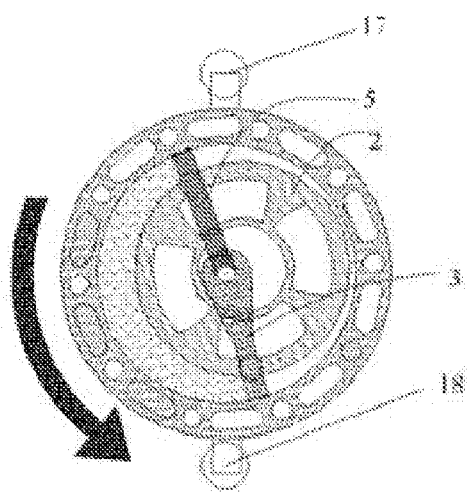
Figure 8A:
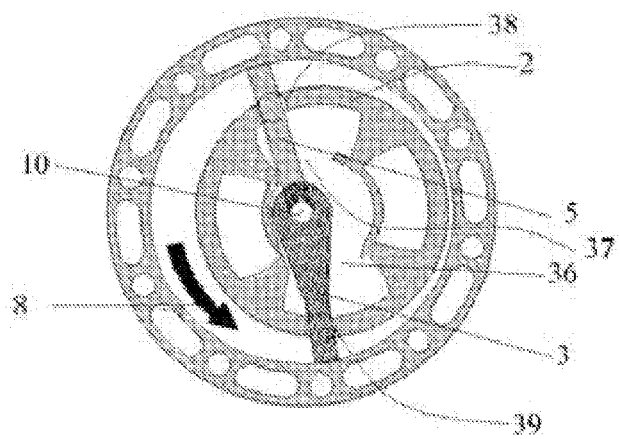
Figure 8B:
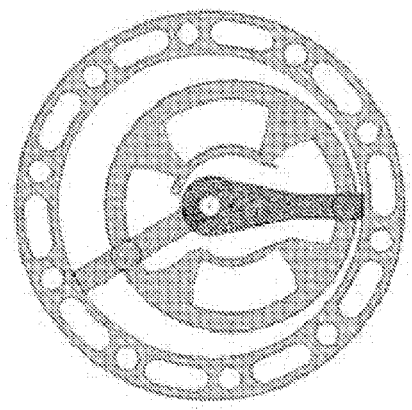
Figure 8C:
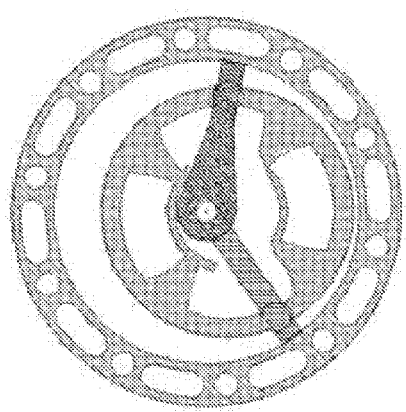
Figure 8D:
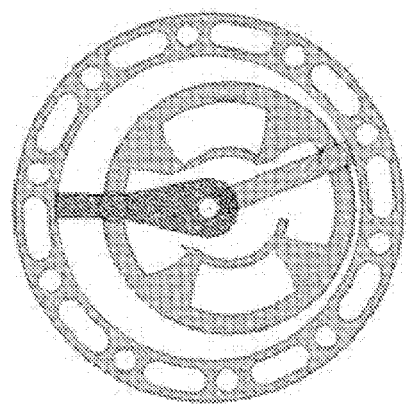

The power shaft rotates at the counter clockwise direction, into inner circular chamber concentrically and whenever the position achieved as like FIG. 7A the inlet valve is opened by camshaft operation and fresh intake air fuel mixture is induced to get into the combustion chamber. Whenever the position achieved like FIG. 7B the inlet valve closes and compression stroke starts. At this time both inlet and exhaust valve remains closed. After rotational progression when the position achieved like FIG. 7C the mixture is fully compressed and at this stage spark plug sparks and tremendous level of torque is being generated in this combustion stroke. This stroke provides power to the engine as momentum and further helps to propagate wheel position to as FIG. 7D for exhaust stroke. Whenever the expanded volume reaches to the maximum, exhaust valve opens by cam drive. If we analyze during fuel burning we can see that because of the circular shape wall of the housing a rotational turbulence can be observed in the burned mixture which will lead to the full burning of the fuel.

As in FIG. 11 the fresh intake air is passed through heat exchanger (56) which extract heat from lubricating oil. The cooled lubricating oil is then recirculated to the engine and heated intake air is allowed through $2^{nd}$ stage heat exchanger (61) to extract heat from exhaust gas. The amount of exhaust gas into the heat exchanger (61) is controlled by a throttle valve which is actuated by advanced microprocessor unit. The other amount of exhaust gas is by passed by (65) line/silencer to the atmosphere. Thus it is possible to maintain a certain peak temperature of intake air which will eventually provide the engine power output stability. Off course it is to be assured that the peak temperature of intake air should be such that it will not create auto ignition in fully compressed condition of air fuel charge. The spark timing can be advanced to enhance power stroke. Vehicle with high rpm and high load spark timing can be advanced considerably (say 30° before fully compressed point) and at low rpm with load, spark timing can be advanced a little. This variable spark timing is controlled by advanced microprocessor unit with the help of timing mark and low powered laser sensor attached at the flywheel which will help to simulate spark timing efficiently.

The final term is the sealing. It has two sealing blocks (44) on the edge of the each bar type (45) circular shaped sealing ring which is installed at edges of wheel (2). The guider hinged wheel has also four bar type sealing objects of cross sectional shape (41) for both inner linear wall and outer circular wall at side. That means total number of sealing objects required will be 14.

This engine is almost vibration less if pair of engines is connected by the power shaft. Obviously to reduce vibration of the engine, the prime mover and follower of $2^{nd}$ engine should be in opposite direction than that of $1^{st}$ engine. Then a combined camshaft will work for inlet valve for $1^{st}$ engine and exhaust valve for the $2^{nd}$ engine. Similar procedure will be observed in exhaust valve for the $1^{st}$ engine and inlet valve for $2^{nd}$ engine.

The hemicycle profiled cam design (28) has been proposed in the aforesaid invention which is pivotally mounted by camshaft and rotatably engaged to an abutment of the outward opening type valve (31) against the valve spring wherein the spring enforces or biasing the outward opening valve (in view of FIG. 5 or FIG. 6) to move away from the internally occupied cylindrical cavity (87) to open a valve port (33) against the cam rotation and on the return stroke the cam by rotation, enforces the valve to do the reverse to close the same against the spring and that also subsequently avoiding any unwanted contradiction between valve and bars during engine operation. This type of valve in connection with cam and spring (arranged in FIG. 5 or FIG. 6) thus assembling a valve assembly which is prominently named as an outward opening valve assembly for the significance of said valve type used wherein the rotation of camshaft for inlet or outlet valve in opening and closing is controlled thru chain drive and by the power shaft. The hemicycle profiled cam is secured with camshaft in the same way as like conventional reciprocating engine where 360° rotation of camshaft equals to 720° rotation of the power shaft.

Claims for my invention are as follows:
1. A rotary engine assembled by at least one engine module and said engine module comprising:
   an inner circular chamber denotes a cylindrical cavity defined by a wall, demarcating only one combustion chamber;
   a power shaft pivotally coupled to, rotating around a first rotary axis while operating coaxially within, said inner circular chamber;
   a main wheel equipped with a concentric void, demarcating said only one combustion chamber and rotating around a second rotary axis within said inner circular chamber wherein the second rotary axis is displaced from the first rotary axis; and
   two bars rotating around said first rotary axis, demarcating said only one combustion chamber by traversing said main wheel radially such that said main wheel, said power shaft and said two bars, rotate at a same direction by being coupled together while transmitting a power to the power shaft wherein said only one combustion chamber having only one combustion event in each 720° rotation of said power shaft.

2. The rotary engine in claim 1, wherein the main wheel further comprises at least two guider hinged wheels whereby each said guider hinged wheel configuring a mechanism thereby to couple each of said two bars within said main wheel.

3. The rotary engine in claim 1, wherein said power shaft extending through the main wheel and the inner circular chamber, further orbiting inside the concentric void with respect to said main wheel.

4. The rotary engine in claim 1, wherein the two bars are coupled with the power shaft in such a way that one of said two bars is fixedly secured with said power shaft while other one of said two bars is hingedly secured with said power shaft.

5. The rotary engine in claim 1 is a four stroke engine.

6. The rotary engine in claim 1, wherein each of said bars having a wiping contact with the inner circular chamber.

7. A rotary engine assembled by at least one engine module while said engine module comprising:
- an inner circular chamber comprises a cylindrical cavity defined by a wall;
- a rotating power shaft rotates around a first rotary axis while operating coaxially within said inner circular chamber;
- a main wheel rotating around a second rotary axis within said inner circular chamber, wherein the second rotary axis is displaced from the first rotary axis; and
- an outward opening valve assembly comprising a rotating hemicycle profiled cam coupled to an abutment of a valve, effectuates said valve to move away from the cylindrical cavity to open a valve port and said rotating hemicycle profiled cam enforces the valve to move toward the cylindrical cavity to close the valve port and retaining the valve port closed up to a desired duration, driven by the power shaft wherein the power shaft rotates by a coupling among the main wheel, only two bars comprising of a first bar that is fixedly secured with said power shaft and a second bar that is hingedly secured with said power shaft and only one active combustion chamber demarcated therewith.

8. The rotary engine in claim 7, wherein one of the outward opening valve assemblies is an inlet valve assembly while other one of the outward opening valve assemblies is an exhaust valve assembly.

9. The rotary engine in claim 7, wherein each of the outward opening valve assemblies further comprises at least one valve spring mechanically coupled between the valve and the valve port.

10. The rotary engine in claim 9 further comprises at least two camshafts rotating around a third axis and a fourth axis wherein each of said camshafts is fixed with at least one said cam.

11. The rotary engine in claim 10, wherein the power shaft drives the outward opening valve assemblies by rotating each of said camshafts.

12. The rotary engine in claim 9, wherein each of said outward opening valve assemblies communicates with said only one active combustion chamber by at least one said valve port.

* * * * *